US006550316B1

(12) United States Patent
Wong et al.

(10) Patent No.: US 6,550,316 B1
(45) Date of Patent: Apr. 22, 2003

(54) ENGINE OFF NATURAL VACUUM LEAKAGE CHECK FOR ONBOARD DIAGNOSTICS

(75) Inventors: Kevin C. Wong, Ann Arbor, MI (US); William Western, Howell, MI (US)

(73) Assignee: General Motors Corporation, Detroit, MI (US)

(*) Notice: Subject to any disclaimer, the term of this patent is extended or adjusted under 35 U.S.C. 154(b) by 0 days.

(21) Appl. No.: 09/967,542

(22) Filed: Oct. 1, 2001

(51) Int. Cl.[7] ................................................ G01M 3/04
(52) U.S. Cl. ...................................... 73/49.7; 73/40.5 R
(58) Field of Search ................................ 73/40, 40.5 R, 73/49.7, 118.1; 123/520; 702/51

(56) References Cited

U.S. PATENT DOCUMENTS 5,263,462 A 11/1993 Reddy ........................ 123/520
5,419,299 A * 5/1995 Fukasawa et al. .......... 123/520
5,614,665 A * 3/1997 Curran et al. .............. 73/118.1
5,637,788 A * 6/1997 Remboski et al. ....... 73/40.5 R
6,321,727 B1 * 11/2001 Reddy et al. ............... 123/520
6,405,718 B1 * 6/2002 Yoshioka et al. ........... 123/520

* cited by examiner

*Primary Examiner*—Daniel S. Larkin
*Assistant Examiner*—C D Garber
(74) *Attorney, Agent, or Firm*—Christopher DeVries

(57) ABSTRACT

A diagnostic method and system detects leaks in a vapor handling system of a vehicle that includes a fuel tank and a pressure/vacuum sensor that senses pressure and vacuum in the fuel tank. A canister recovers vapor from the fuel tank. A canister vent solenoid selectively provides atmospheric air to the canister. A controller connected to the canister vent solenoid and the pressure/vacuum sensor executes a leakage detection test that is capable of detecting leaks in the vapor handling system that have a diameter on the order of 0.020 inch. The leakage detection test includes a volatility test phase, a pressure phase, a vacuum phase, an analysis phase and a results phase. In other features, the leakage detection algorithm generates data sets having greater than 25 standard deviations between leakage and no-leakage data sets.

34 Claims, 6 Drawing Sheets

ENGINE OFF NATURAL VACUUM LEAKAGE CHECK FOR ONBOARD DIAGNOSTICS

TECHNICAL FIELD

The present invention relates to on board diagnostics for vehicles, and more particularly to an engine off natural vacuum leakage check for a vapor handling system of a vehicle with an internal combustion engine.

BACKGROUND OF THE INVENTION

In a conventional vapor handling system for an engine, fuel vapor that escapes from a fuel tank is stored in a canister. If there is a leak in the fuel tank, the canister or any other component of the vapor handling system, some fuel vapor can escape into the atmosphere instead of being stored in the canister. Leaks in the vapor handling system contribute to vehicle emissions.

In one approach set forth in U.S. Pat. No. 5,263,462 to Reddy, a controller that is connected to temperature and pressure/vacuum sensors monitors the vapor handling system. While the vehicle is soaking (engine off), the temperature sensor monitors the temperature in the fuel tank. If the temperature increases by a preselected temperature increment, a temperature switch changes state. The pressure/vacuum sensor monitors the pressure of the fuel tank and the vent lines and triggers a pressure switch if a preselected pressure is exceeded during soak. The pressure switch is set at a preselected pressure value that is lower than a threshold pressure of a pressure control valve. The pressure switch allows vapor to vent from the fuel tank to the canister.

At engine start-up, the controller checks whether the fuel tank experienced an adequate heat build-up during the soak. In other words, the controller checks whether the temperature switch was set while the engine as off. If the preselected temperature increase was not achieved, the switch is not set and the diagnostic leak check is not performed. If the temperature switch is set, then the controller determines whether the pressure switch is set. If the pressure switch is set, there is no leak in the system since the vapor handling system was able to maintain a preselected pressure. If the pressure switch is not set, then the vapor handling system could not achieve the preselected pressure because the vapors leaked into the atmosphere. The diagnostic system indicates the presence of a leak if the temperature switch is set during a soak and the pressure switch is not set.

Another approach measures a temperature decrease in the fuel tank while the engine is soaking and measures the fuel tank vacuum. A timer tabulates and stores the elapsed time that the engine is running. If the elapsed time is greater than a preselected time, the fuel tank was sufficiently hot before the soak. The engine coolant temperature is monitored at engine start-up. If the engine temperature is less than a preselected temperature, the fuel tank is cool. If the elapsed time is greater than the preselected time and the engine temperature is less than the preselected temperature, the fuel tank temperature decreased so that a vacuum should have been created in the fuel tank.

A vacuum sensor monitors the vacuum of the fuel tank and vent lines and sets a switch (vacuum) if a preselected vacuum is attained during the soak. If the vacuum switch was not set while the fuel tank temperature decreased, the controller diagnoses a leak in the vapor handling system.

The foregoing approach relies on a temperature sensor to provide temperature information for an ideal gas law math correlation. In use, it has been determined that there is no reliable correlation between temperature and vacuum due to the mass transfer between the liquid and the vapor in a fuel tank. Because the correlation is not reliable, the conventional temperature/pressure model is not valid for leak diagnosis.

Other conventional leakage diagnosis systems include a vacuum pulldown method that uses engine manifold vacuum and leak down rates to diagnose a leak. The drawback of this method is a lack of sufficient resolution to detect small leaks. In the near future, the government will require the detection of leaks on the order of 0.020 inch in diameter in vehicle vapor handling systems. The vacuum pulldown method cannot detect leaks this small. In addition, the vacuum pulldown method requires stiff fuel tanks. The vacuum pulldown method also has poor separation between good and failed data sets, which increases faulty detection rates.

Another conventional leakage diagnosis system uses a normally closed canister vent and measures vacuum over a relatively long period of time while the engine is off. One drawback to this method is the cost of additional hardware and the long test times that are required. Another engine off natural vacuum method assumes a mathematical correlation between temperature and vacuum build. Drawbacks of this method are the cost of the temperature sensor, lack of adequate correlation (resulting in poor prediction and poor data separation), and the inability to run the leak test in hotter ambient temperatures that are common in southwest United States.

SUMMARY OF THE INVENTION

A diagnostic method and system according to the invention for detecting leaks in a vapor handling system of a vehicle includes a fuel tank and a pressure/vacuum sensor that senses pressure and vacuum in the fuel tank. A canister recovers vapor from the fuel tank. A canister vent solenoid selectively provides atmospheric air to the canister. A controller connected to the canister vent solenoid and the pressure/vacuum sensor executes a leakage detection test that is capable of detecting leaks in the vapor handling system that have a diameter on the order of 0.020 inch.

In other features of the invention, the leakage detection algorithm generates data sets having greater than 25 standard deviations between leakage and no-leakage data sets. The leakage detection test includes a volatility test phase. The volatility test phase classifies a volatility of the vapor in the fuel tank into low, medium and high volatility. The leakage diagnostic test is aborted if the volatility is high.

In still other features, the leakage diagnostic test includes a pressure phase that is performed after the volatility test phase. During the pressure phase, the controller closes the canister vent solenoid and measures a pressure change in the fuel tank. If the pressure is increasing and the pressure change exceeds a pressure target value, the controller initiates an analysis phase. If the pressure is not increasing, the controller checks for a vacuum and performs a vacuum phase if the vacuum is present. If the pressure is not increasing and a vacuum is not present, the controller initiates the vacuum phase if the pressure remains zero for a first predetermined period.

In still other features, during the analysis phase, the controller opens the canister vent solenoid, sums an absolute value of a pressure change and an absolute value of a vacuum change, and initiates a reporting phase. During the reporting phase, the controller inputs the sum to an exponentially-weighted moving average, compares the exponentially-weighted moving average to a threshold, and declares a leak if the exponentially-weighted moving average exceeds the threshold.

In yet other features of the invention, during the vacuum phase, the controller opens the canister vent solenoid for a second predetermined period so that the vacuum phase begins at atmospheric pressure. The controller sets a vacuum target value equal to a total target value minus the pressure change measured in the pressure phase. The controller closes the canister vent solenoid and measures a vacuum change. If the vacuum is increasing and the vacuum change exceeds the target value, the controller initiates the analysis phase. If the vacuum is decreasing after a period of increasing vacuum, the controller initiates the analysis phase. If pressure is built, the solenoid is opened for a time and then reclosed to attempt the vacuum phase. If the vacuum is zero for a second predetermined period, the controller initiates the analysis phase.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DESCRIPTION OF THE PREFERRED EMBODIMENT

The following description of the preferred embodiment(s) is merely exemplary in nature and is in no way intended to limit the invention, its application or uses.

Figure 1:
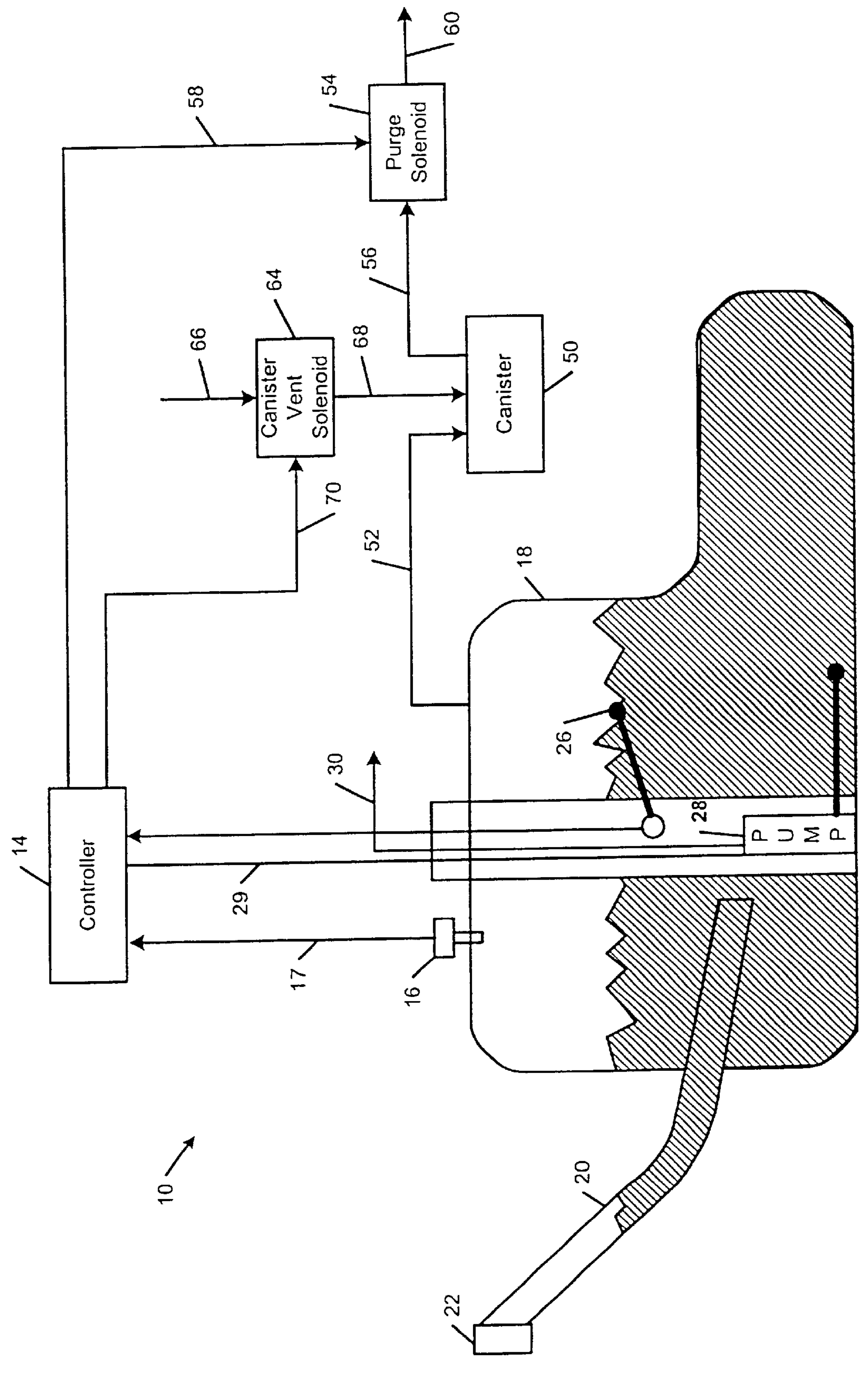
FIG. 1 is a functional block diagram of an engine off natural vacuum diagnostic system for detecting leakage from vapor handling systems of a vehicle.

Referring now to FIG. 1, an engine off natural vacuum diagnostic system 10 is a shown. The engine off natural vacuum diagnostic system 10 includes a controller 14 that is connected to a pressure/vacuum sensor 16. The controller 14 is preferably the engine control module. However, the controller 14 can be a stand-alone controller or combined with other on board controllers. The controller 14 includes a processor, memory such as random access memory (RAM), read only memory (ROM) or other suitable electronic storage.

The pressure/vacuum sensor 16 measures pressure and vacuum in a fuel tank 18 of a vehicle. Connecting wire 17 connects the pressure/ vacuum sensor 16 to the controller 14. The fuel tank 18 includes a fuel filler conduit 20 and a gas cap 22. The fuel tank 18 further includes a fuel level meter 26 that provides an indication of the level of fuel in the fuel tank 18. The fuel meter 26 includes sending electronics (not shown) that output a signal to the controller 14. Power to a fuel pump 28 is controlled by the controller via pump power wires 29. The fuel pump 28 provides fuel in the fuel line 30.

A canister 50 is in fluid communication with the fuel tank 18 via a canister line 52. Vapor from the fuel tank 18 flows through the canister line 52 to the canister 50. The canister 50 recovers vapors and is preferably a charcoal canister. The canister 50 is also in fluid communication with a purge solenoid 54 through a purge solenoid line 56. The purge solenoid 54 is connected to the controller 14 via a connecting wire 58. An output of the purge solenoid 54 is connected to an engine line 60. A canister vent solenoid 64 has a fresh air intake line 66 and a canister line 68 that is connected to the canister 50. The controller 14 is connected to the canister vent solenoid via connecting wires 70.

The engine off natural vacuum diagnostic system 10 according to the present invention is designed to detect leaks on the order of 0.020 inch in diameter in the fuel storage system of the vehicle. The data that is generated by the diagnostic system 10 produces good and fail data with separation of at least 25 standard deviations. In some cases, 50 standard deviations can be obtained. As a result, the leakage detection diagnosis is highly accurate and not subject to false alarms. The engine off natural vacuum diagnostic system 10 operates after the vehicle has been run and has been turned off using the ignition switch (not shown). The engine off natural vacuum diagnostic system 10 uses the existing evaporative emissions control and fuel storage components that are illustrated in FIG. 1. Therefore, the cost of the diagnostic system 10 is less than systems using both temperature and pressure sensors. The controller 14 stays awake for a predetermined amount of time after the ignition has been turned off to run the engine off natural vacuum diagnostic, as will be described further below.

Figure 2:
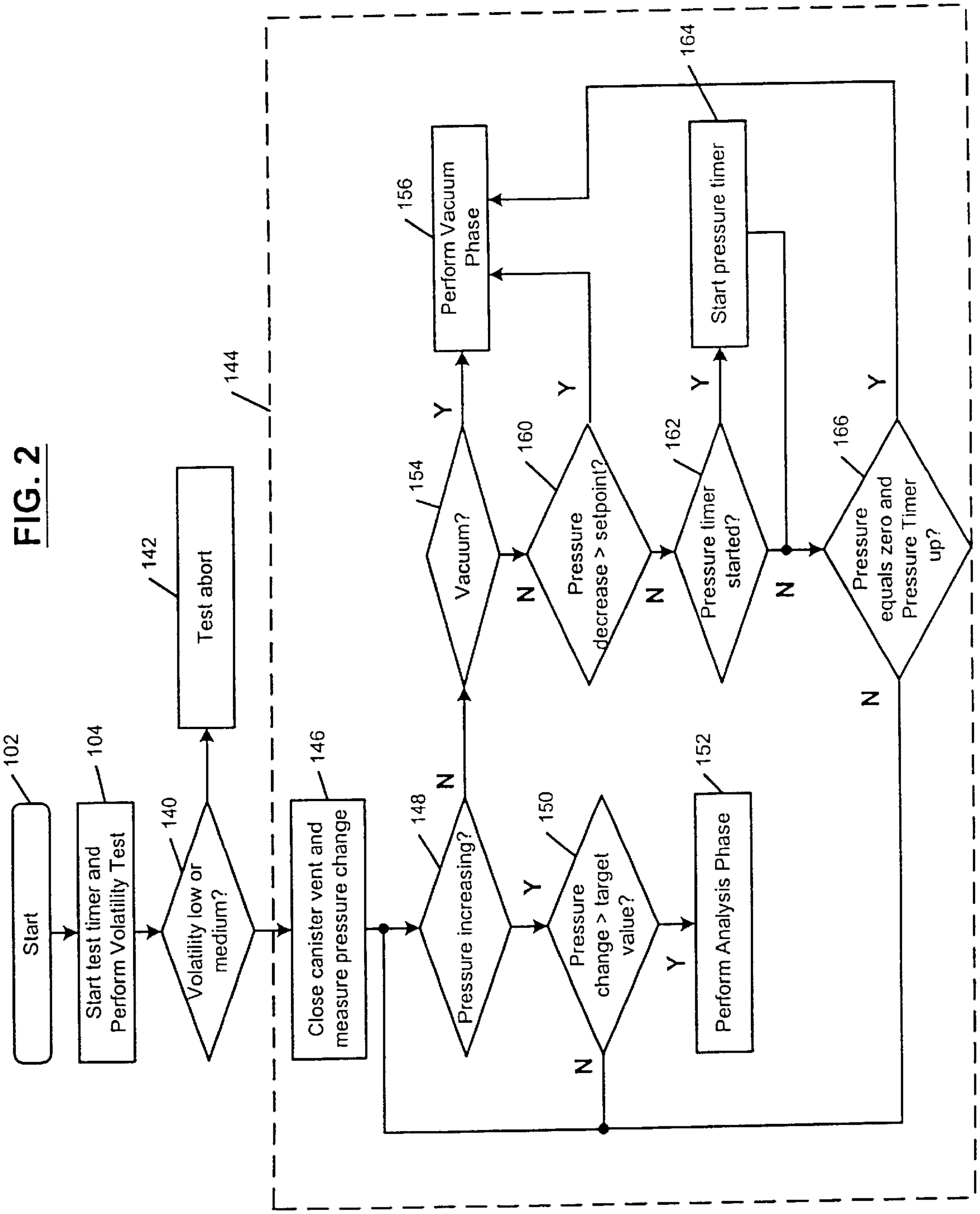
FIG. 2 is a flow chart illustrating steps of a pressure phase of the engine off natural vacuum diagnostic system.
Figure 3:
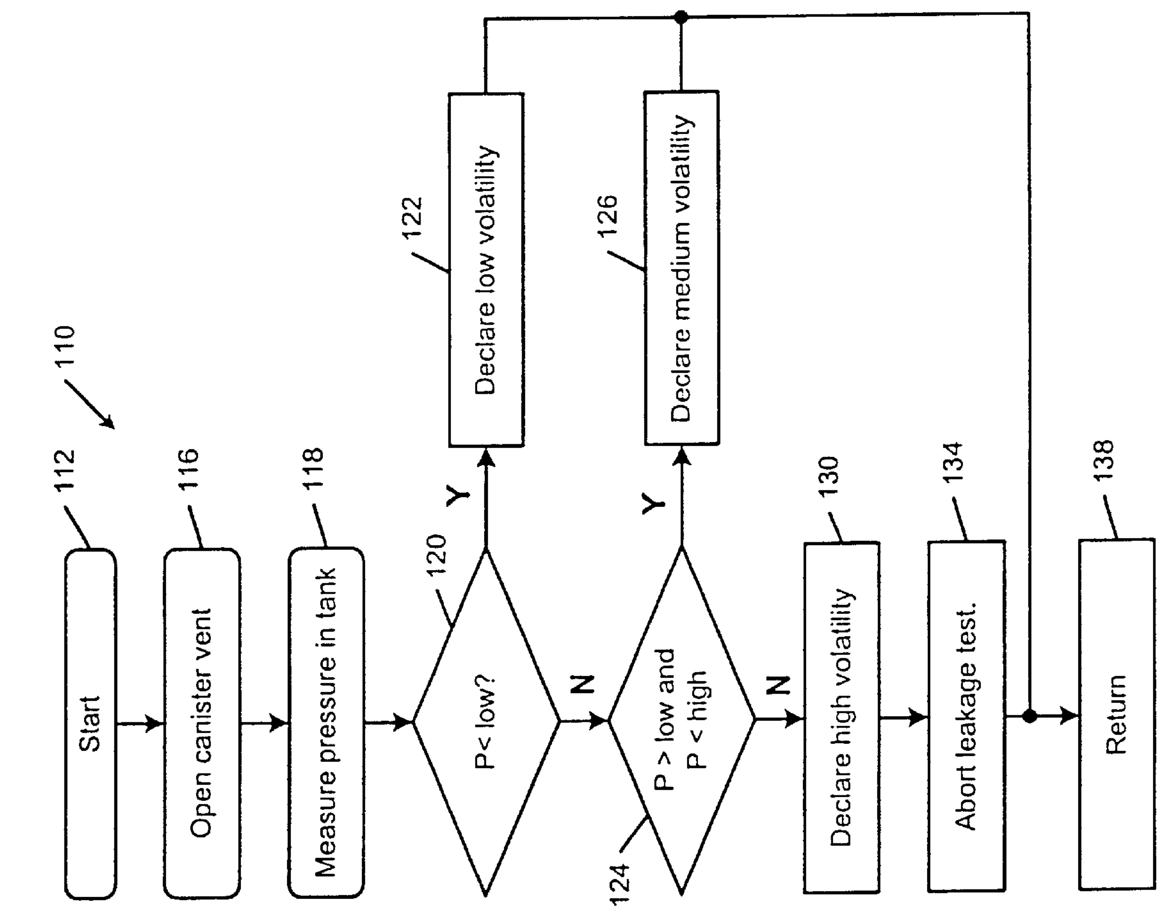
FIG. 3 is a flow chart illustrating steps of a volatility test phase of the engine off natural vacuum diagnostic system.

Referring now to FIG. 2, a pressure phase of the engine off natural vacuum diagnostic is shown. Control begins with step 102. In step 104, the controller 14 starts a test timer and performs a volatility test phase (before the pressure phase) that is depicted in FIG. 3. Referring now to FIG. 3, the volatility test phase 110 is shown. Control begins with step 112. In step 116, the controller 14 opens the canister vent solenoid 64. In step 118, the controller 14 measures the pressure in the fuel tank 18 using the pressure/vacuum sensor 16. To increase accuracy, the pressure is preferably integrated over a first time period. In step 120, the controller 14 determines whether the pressure is less than a low volatility value. If it is, control continues with step 122 where low volatility is declared. Otherwise, control continues with step 124 where the controller 14 compares the pressure in the fuel tank 18 with high and low volatility values. If the pressure falls between the high and low values, control continues with step 126. In step 126, the controller 14 declares medium volatility. Otherwise, the controller continues with step 138 where high volatility is declared. In step 134, the leakage diagnostic test is aborted. Control continues from steps 122, 126 and 134 to step 138. In step 138, control returns to step 140.

In step 140, the controller 14 determines whether the declared volatility was either low or medium. If not, the leakage diagnostic test is aborted in step 142. Otherwise, control continues with the pressure phase that is identified by dotted lines 144. In step 146, the canister vent solenoid 64 is closed and the controller 14 measures the pressure change in the fuel tank 18. In step 148, the controller 14 determines whether the pressure is increasing. If it is, control continues with step 150. In step 150, the controller 14 determines whether the pressure change exceeds a target value. If it does, control continues with step 152 where the analysis phase is initiated. If the pressure change does not exceed the target value as determined in step 150, control continues with step 148.

If the pressure is not increasing as determined in step 148, control continues with step 154. In step 154, the controller 14 determines whether a vacuum is present. If a vacuum is present, control continues with step 156 where a vacuum phase is initiated. Otherwise, control continues with step 160. In step 160, the controller 14 determines whether a pressure decrease is greater than a set point. If it is, control continues with step 156 and performs the vacuum phase. Otherwise, control continues with step 162. In step 162, the controller 14 determines whether a pressure timer has been started. If not, the controller 14 continues with step 164 where a pressure timer is started. Otherwise, control continues with step 166 where the controller 14 determines whether the pressure equals zero and the pressure timer is up. If it is, control continues with step 156 and performs the vacuum phase. Otherwise, control continues with step 148.

Figure 4:
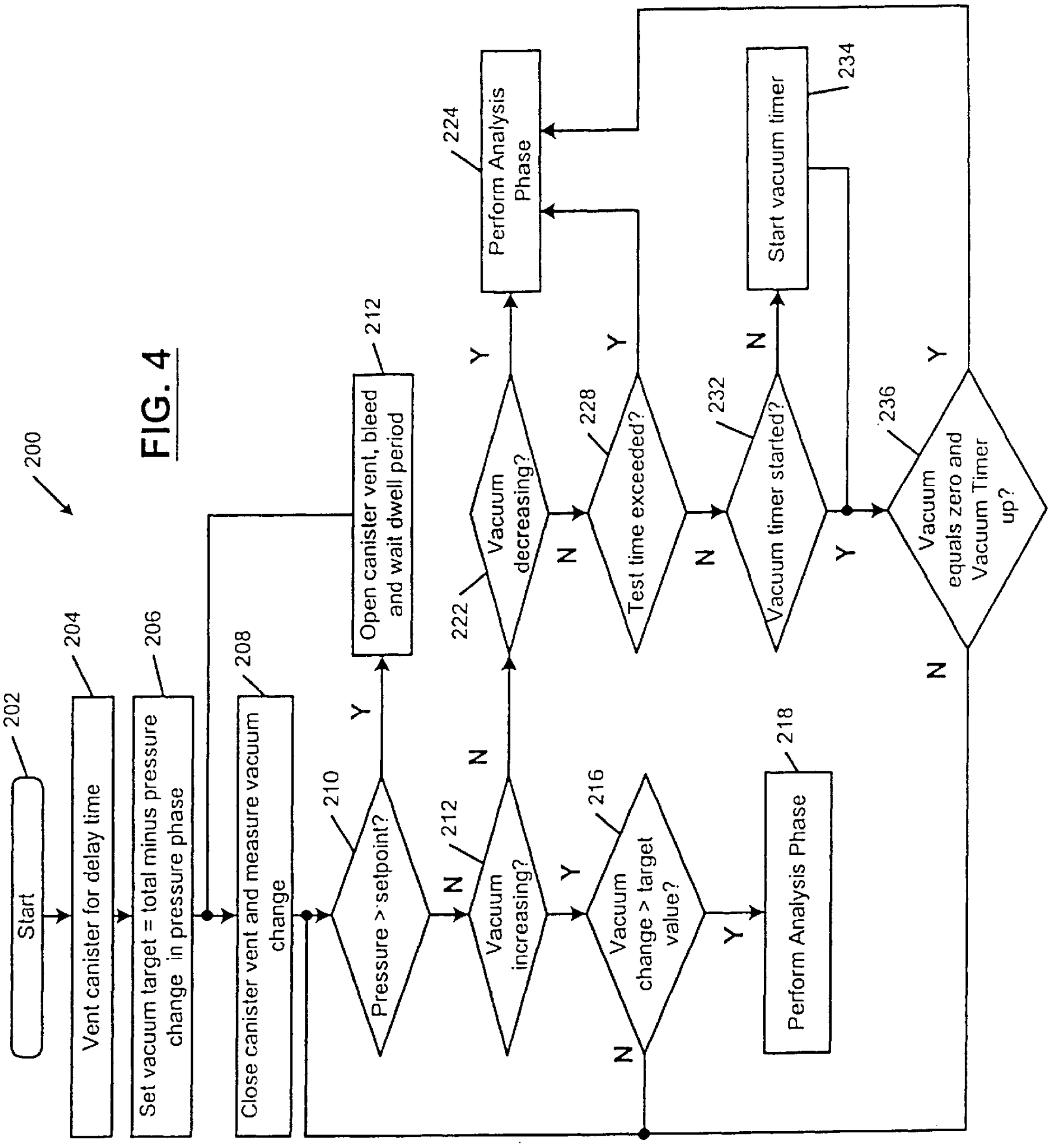
FIG. 4 is a flow chart illustrating steps of a vacuum phase of the engine off natural vacuum diagnostic system.

Referring now to FIG. 4, the vacuum phase 200 is shown. Control begins with step 202. In step 204, the canister vent solenoid 64 is opened for a delay period. In step 206, the vacuum target is set equal to the total target minus the pressure change from the pressure phase. In step 208, the canister vent solenoid 64 is closed and a vacuum change is measured. In step 210, the controller 14 determines whether the pressure exceeds a set point. If it does, control continues with step 212 where the controller 14 opens the canister vent solenoid 64, bleeds the pressure, waits a dwell period and returns to step 208. If the pressure does not exceed the set point in step 210, control continues with step 212 where the controller 14 determines whether the vacuum is increasing. If it is, control continues with step 216 where the controller 14 determines whether the vacuum change exceeds a target value. If it does, control continues with the step 218 where the analysis phase is performed. Otherwise, control loops back to step 210.

If the vacuum is not increasing as determined in step 212, control continues with step 222 where the controller 14 determines whether the vacuum is decreasing. If it is, control continues with step 224 where the analysis phase is performed. Otherwise, control continues with step 228 where control determines whether a test timer has been exceeded. If it has, control continues with step 224 and performs the analysis phase. Otherwise, control continues with step 232 where the controller 14 determines whether a vacuum timer has been started. If not, control continues with step 234 and starts the vacuum timer. Otherwise, control determines whether the vacuum equals zero and the vacuum timer is up. If it is, control continues with step 224 and performs the analysis phase. Otherwise, control continues with step 210.

Figure 5:
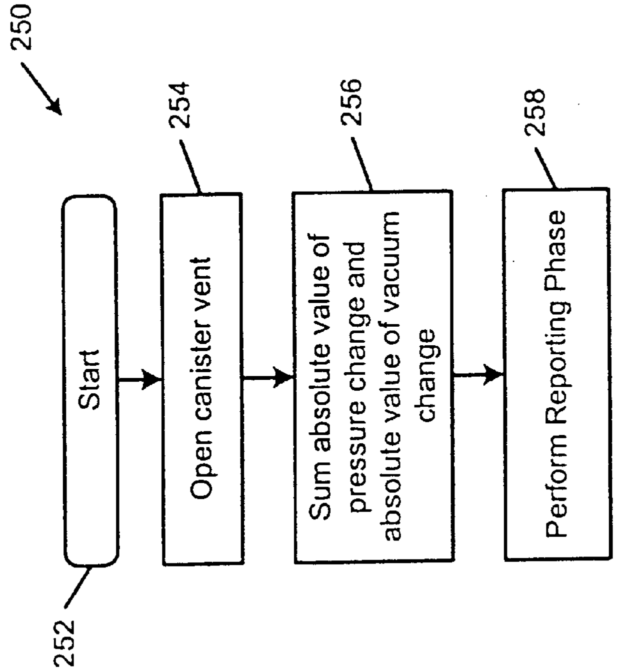
FIG. 5 is a flow chart illustrating steps of an analysis phase of the engine off natural vacuum diagnostic system.

Referring now to FIG. 5, the analysis phase is shown in more detail and is generally designated 250. Control begins with step 252. In step 254, the canister vent solenoid 64 is opened. In step 256, the absolute value of the pressure change and the absolute value of the vacuum change are summed. In step 258, the reporting phase is performed.

Figure 6:
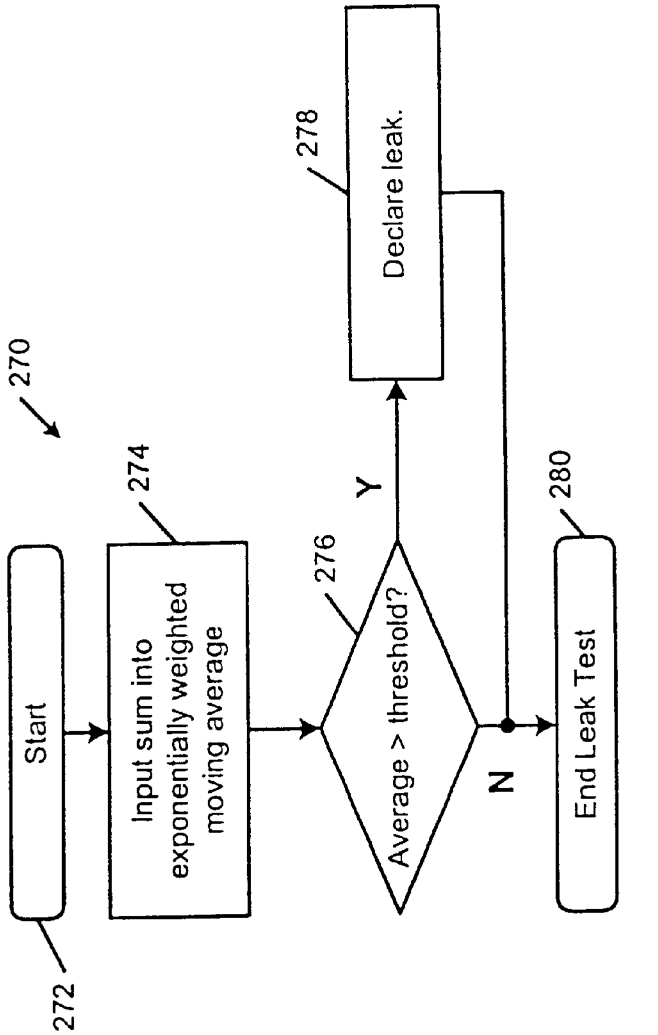
FIG. 6 is a flow chart illustrating steps of a results phase of the engine off natural vacuum diagnostic system.

Referring now to FIG. 6, the reporting phase is shown and is generally designated 270. Control begins with step 272. In step 274, the sum that was calculated in the analysis phase is input into an exponentially-weighted moving average. In step 276, the average is compared to a threshold. If the average is greater than the threshold, control continues with step 278 and a leak is declared. Otherwise, control continues with step 280 (no leak is declared) and the leak test is ended.

Figure 7:
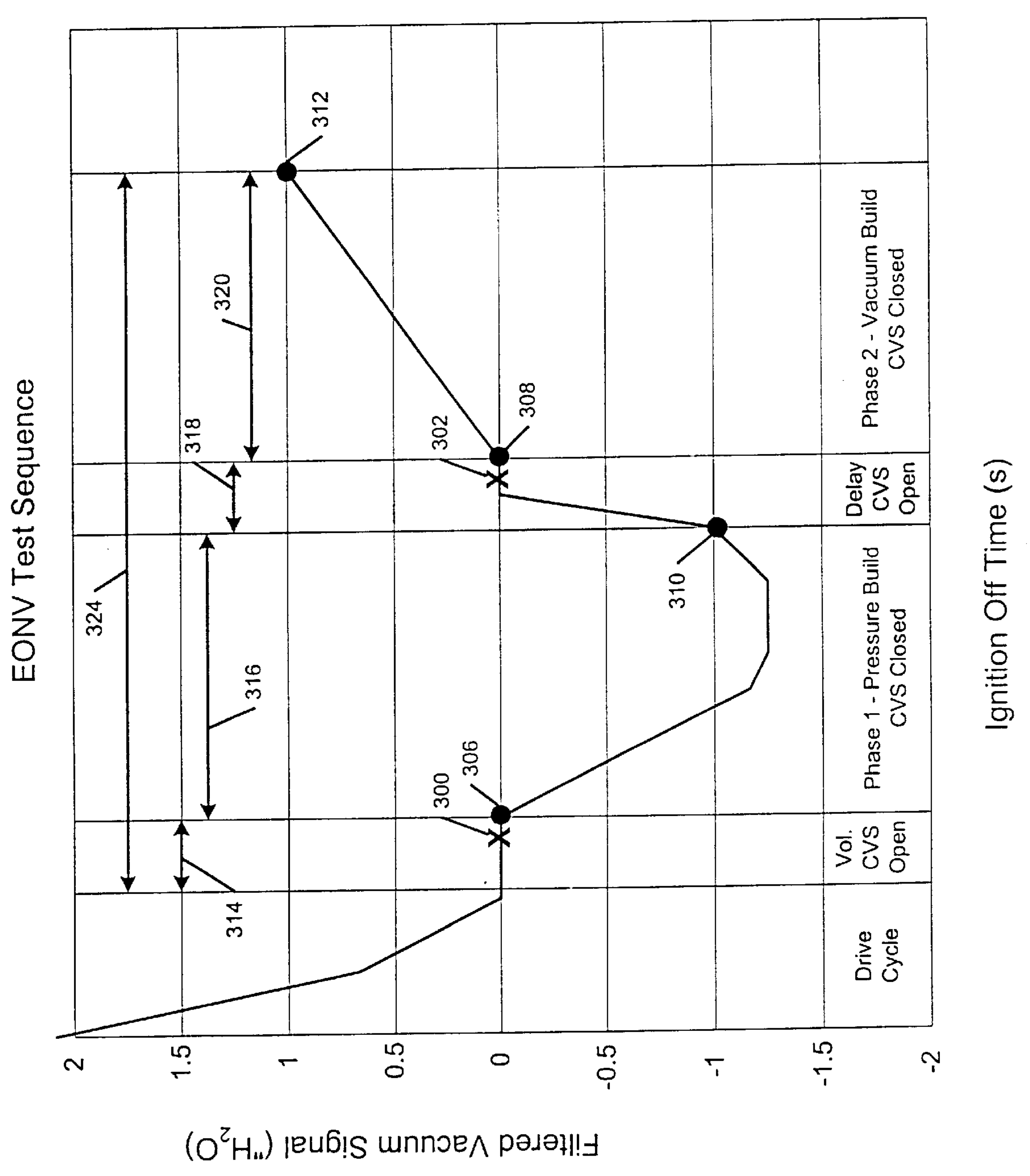
FIG. 7 is a graph illustrating a filtered vacuum signal as a function of ignition off time for an engine off natural vacuum diagnostic system test sequence.

Referring now to FIG. 7, a test sequence of the engine off natural vacuum diagnostic system is shown. Auto zero locations are shown at the 300 and 302. Autozero locations adjust for vacuum sensor hysteresis when the sensor measures atmospheric pressure, and is then used to measure either vacuum or pressure. When the tank returns to atmospheric pressure, the sensor will read a slightly different value than when atmospheric pressure was originally read.

The canister vent solenoid 64 is closed at 306 and 308. The canister vent solenoid 64 is opened at 310 and 312. The time period that is indicated by arrow 314 is equal to the volatility check timer. The time period that is indicated by arrow 316 is equal to the pressure phase timer. The time phase that is indicated by arrow 318 is equal to a dwell time between the pressure and vacuum phase. The time period that is indicated by arrow 320 is equal to the vacuum phase timer. The time period that is indicated by arrow 324 is equal to the total test timer.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A diagnostic system for detecting leaks in a vapor handling system of a vehicle, comprising:

a fuel tank;

a pressure/vacuum sensor that senses pressure and vacuum in said fuel tank;

a canister for recovering vapor from said fuel tank;

a canister vent solenoid for selectively providing atmospheric air to said canister;

a controller connected to said canister vent solenoid and said pressure/vacuum sensor that executes a leakage detection test that detects leaks in said vapor handling system that have a minimum diameter on the order of 0.020 inch; and wherein said leakage detection algorithm generates data sets having greater than 25 standard deviations between leakage and no-leakage data sets.

2. The diagnostic system of claim 1 wherein said leakage detection test includes a volatility test phase.

3. The diagnostic system of claim 2 wherein said volatility test phase classifies a volatility of said vapor in said fuel tank into low, medium and high volatility, and wherein said leakage diagnostic test is aborted if said volatility is high.

4. The diagnostic system of claim 2 wherein said leakage diagnostic test includes a pressure phase that is performed after said volatility test phase.

5. The diagnostic system of claim 4 wherein, during said pressure phase, said controller closes said canister vent solenoid and measures a pressure change in said fuel tank.

6. The diagnostic system of claim 5 wherein, during said pressure phase, if said pressure is increasing and said pressure change exceeds a pressure target value, said controller initiates an analysis phase.

7. The diagnostic system of claim 6 wherein, during said pressure phase, if said pressure is not increasing, said controller checks for a vacuum and performs a vacuum phase if said vacuum is present.

8. The diagnostic system of claim 7 wherein, during said pressure phase, if said pressure is not increasing and said vacuum is not present, said controller initiates said vacuum phase if said pressure remains zero for a first predetermined period.

9. The diagnostic system of claim 8 wherein, during said analysis phase, said controller opens said canister vent solenoid, sums an absolute value of a pressure change and an absolute value of a vacuum change and initiates a reporting phase.

10. The diagnostic system of claim 9 wherein, during said reporting phase, said controller inputs said sum to an exponentially-weighted moving average, compares said exponentially-weighted moving average to a threshold and declares a leak if said exponentially-weighted moving average exceeds said threshold.

11. The diagnostic system of claim 10 wherein, during said vacuum phase, said controller opens said canister vent solenoid for a second predetermined period so that said vacuum phase begins at atmospheric pressure.

12. The diagnostic system of claim 11 wherein, during said vacuum phase, said controller sets a vacuum target equal to a total target minus said pressure change measured in said pressure phase.

13. The diagnostic system of claim 12 wherein, during said vacuum phase, said controller closes said canister vent solenoid and measures a vacuum change.

14. The diagnostic system of claim 13 wherein, during said vacuum phase, if said vacuum is increasing and said vacuum change exceeds said target value, said controller initiates said analysis phase.

15. The diagnostic system of claim 14 wherein, during said vacuum phase, if said vacuum is decreasing said controller initiates said analysis phase.

16. The diagnostic system of claim 15 wherein, during said vacuum phase, if said vacuum is zero for a second predetermined period said controller initiates said analysis phase.

17. A diagnostic method for detecting leaks in a vapor handling system of a vehicle, comprising:

sensing pressure and vacuum in a fuel tank of said vehicle;

recovering vapor from said fuel tank using a canister;

selectively providing atmospheric air to said canister using a canister vent;

executing a leakage detection test using a controller, wherein said leakage detection test detects leaks in said vapor handling system that have a minimum diameter on the order of 0.020 inch; and generating data sets having greater than 25 standard deviations between leakage and no-leakage data sets.

18. The diagnostic method of claim 17 further comprising the step of performing a volatility test phase during said leakage detection test.

19. The diagnostic method of claim 18 further comprising the step of classifying a volatility of said vapor in said fuel tank into low, medium and high volatility during said volatility test, wherein said leakage diagnostic test is aborted if said volatility is high.

20. The diagnostic method of claim 19 wherein said leakage diagnostic test includes a pressure phase that is performed after said volatility test phase.

21. The diagnostic method of claim 20 further comprising the step of closing said canister vent and measuring a pressure change in said fuel tank during said pressure phase.

22. The diagnostic method of claim 21 further comprising the step of initiating an analysis phase during said pressure phase if said pressure is increasing and said pressure change exceeds a pressure target value.

23. The diagnostic method of claim 22 further comprising the step of during said pressure phase, if said pressure is not increasing, checking for a vacuum and performing a vacuum phase if said vacuum is present.

24. The diagnostic method of claim 23 further comprising the step of during said pressure phase, if said pressure is not increasing and a vacuum is not present, initiating said vacuum phase if said pressure remains zero for a first predetermined period.

25. The diagnostic method of claim 24 further comprising the steps of:

during said analysis phase, opening said canister vent;

summing an absolute value of a pressure change and an absolute value of a vacuum change; and initiating a reporting phase.

26. The diagnostic method of claim 25 further comprising the steps of:

during said reporting phase, inputting said sum to an exponentially-weighted moving average;

comparing said exponentially-weighted moving average to a threshold; and declaring a leak if said exponentially-weighted moving average exceeds said threshold.

27. The diagnostic method of claim 26 further comprising the step of during said vacuum phase, opening said canister vent for a second predetermined period so that said vacuum phase begins at atmospheric pressure.

28. The diagnostic method of claim 27 further comprising the step of during said vacuum phase, setting a vacuum target equal to a total target minus said pressure change measured in said pressure phase.

29. The diagnostic method of claim 28 further comprising the step of during said vacuum phase, closing said canister vent and measuring a vacuum change.

30. The diagnostic method of claim 29 further comprising the step of during said vacuum phase, if said vacuum is increasing and said vacuum change exceeds said target value, initiating said analysis phase.

31. The diagnostic method of claim 30 further comprising the step of initiating said analysis phase if said vacuum is decreasing during said vacuum phase.

32. The diagnostic method of claim 31 further comprising the step of initiating said analysis phase during said vacuum phase if said vacuum is zero for a second predetermined period.

33. A diagnostic system for detecting leaks in a vapor handling system of a vehicle, comprising:

a fuel tank;

a pressure/vacuum sensor that senses pressure and vacuum in said fuel tank;

a canister for recovering vapor from said fuel tank;

a canister vent solenoid for selectively providing atmospheric air to said canister;

a controller connected to said canister vent solenoid and said pressure/vacuum sensor that executes a leakage detection test that detects leaks in said vapor handling system;

wherein said leakage detection test includes a volatility test phase;

wherein said volatility test phase classifies a volatility of said vapor in said fuel tank;

wherein said leakage diagnostic test is aborted if said volatility is high;

wherein said leakage diagnostic test includes a pressure phase that is performed after said volatility test phase;

wherein, during said pressure phase, said controller closes said canister vent solenoid and measures a pressure change in said fuel tank;

wherein, during said pressure phase, if said pressure is increasing and said pressure change exceeds a pressure target value, said controller initiates an analysis phase; and wherein, during said pressure phase, if said pressure is not increasing, said controller checks for a vacuum and performs a vacuum phase if said vacuum is present.

34. A diagnostic method for detecting leaks in a vapor handling system of a vehicle comprising:

sensing pressure and vacuum in a fuel tank of said vehicle;

recovering vapor from said fuel tank using a canister;

selectively providing atmospheric air to said canister using a canister vent; and executing a leakage detection test using a controller, wherein said leakage detection test detects leaks in said vapor handling system;

performing a volatility test phase during said leakage detection test;

classifying a volatility of said vapor m said fuel tank during said volatility test;

wherein said leakage diagnostic test is aborted if said volatility is high;

wherein said leakage diagnostic test includes a pressure phase that is performed after said volatility test phase;

measuring a pressure change in said fuel tank during said pressure phase; and initiating an analysis phase during said pressure phase if said pressure is increasing and said pressure change exceeds a pressure target value.

* * * * *